US012666330B2

(12) United States Patent
Jung et al.

(10) Patent No.: US 12,666,330 B2
(45) Date of Patent: Jun. 23, 2026

(54) METHOD AND APPARATUS FOR PROVIDING NETWORK SWITCHING SERVICE IN 5G COMMUNICATION SYSTEM

(71) Applicant: KT CORPORATION, Gyeonggi-do (KR)

(72) Inventors: Ji-Young Jung, Gyeonggi-do (KR);
Kun-Woo Park, Gyeonggi-do (KR);
Se-Hoon Kim, Gyeonggi-do (KR);
Il-Yong Kim, Gyeonggi-do (KR);
Sang-Hyun Park, Gyeonggi-do (KR);
Ho-Jun Jang, Gyeonggi-do (KR);
Won-Chang Cho, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 316 days.

(21) Appl. No.: 18/376,574

(22) Filed: Oct. 4, 2023

(65) Prior Publication Data

US 2024/0114414 A1      Apr. 4, 2024

(30) Foreign Application Priority Data

Oct. 4, 2022     (KR) ......................... 10-2022-0126546

(51) Int. Cl.
| | |
|---|---|
| *H04W 36/14* | (2009.01) |
| *H04W 60/00* | (2009.01) |
| *H04W 76/10* | (2018.01) |

(52) U.S. Cl.
CPC ........... *H04W 36/14* (2013.01); *H04W 60/00* (2013.01); *H04W 76/10* (2018.02)

(58) Field of Classification Search
CPC ...... H04W 36/14; H04W 76/10; H04W 60/00
See application file for complete search history.

(56) References Cited

U.S. PATENT DOCUMENTS

2019/0261157 A1* 8/2019 Ramle ................... H04W 48/18
2019/0313236 A1  10/2019 Lee et al.
(Continued)

FOREIGN PATENT DOCUMENTS

| KR | 10-2019-0118072 A | 10/2019 |
|---|---|---|
| KR | 10-2020-0020544 A | 2/2020 |

(Continued)

*Primary Examiner* — Justin Y Lee
(74) *Attorney, Agent, or Firm* — IP Legal Services, LLC

(57) ABSTRACT

Provided are a method and apparatus for providing a network switching service to a user equipment. A method of a network apparatus for enabling a user equipment to switch a communication network between a public network and a private network by communicating with a subscriber apparatus, where the subscriber apparatus stores subscribed Network Slice Selection Assistance Information (NSSAI) of the user equipment and a network selection discriminator (NSD) at a subscriber profile, the network selection discriminator (NSD) indicates a network selected by the user equipment, the method may include receiving a registration request from the user equipment and transmitting a slice selection subscription data request to the subscriber apparatus; receiving the subscribed NSSAI from the subscriber apparatus, wherein as the subscribed NSSSAI, subscribed single (S)-NSSAI with at least one value is received; transmitting a registration response including allowed S-NSSAI based on the received subscribed S-NSSAI; and receiving a session establishment request including the allowed S-NSSAI from the user equipment and creating a session to one of the public network and the private network according to the allowed S-NSSAI included in the session establishment request.

17 Claims, 9 Drawing Sheets

(56) References Cited

U.S. PATENT DOCUMENTS

| | | | |
|---|---|---|---|
| 2020/0120589 | A1 | 4/2020 | Velev et al. |
| 2022/0030513 | A1 | 1/2022 | Velev et al. |
| 2025/0016208 | A1* | 1/2025 | Wang ................... H04L 69/322 |

FOREIGN PATENT DOCUMENTS

| | | | |
|---|---|---|---|
| KR | 10-2020-0126203 | A | 11/2020 |
| KR | 10-2227550 | B1 | 3/2021 |
| KR | 10-2021-0079048 | A | 6/2021 |
| KR | 10-2401990 | B1 | 5/2022 |

* cited by examiner

FIG. 3

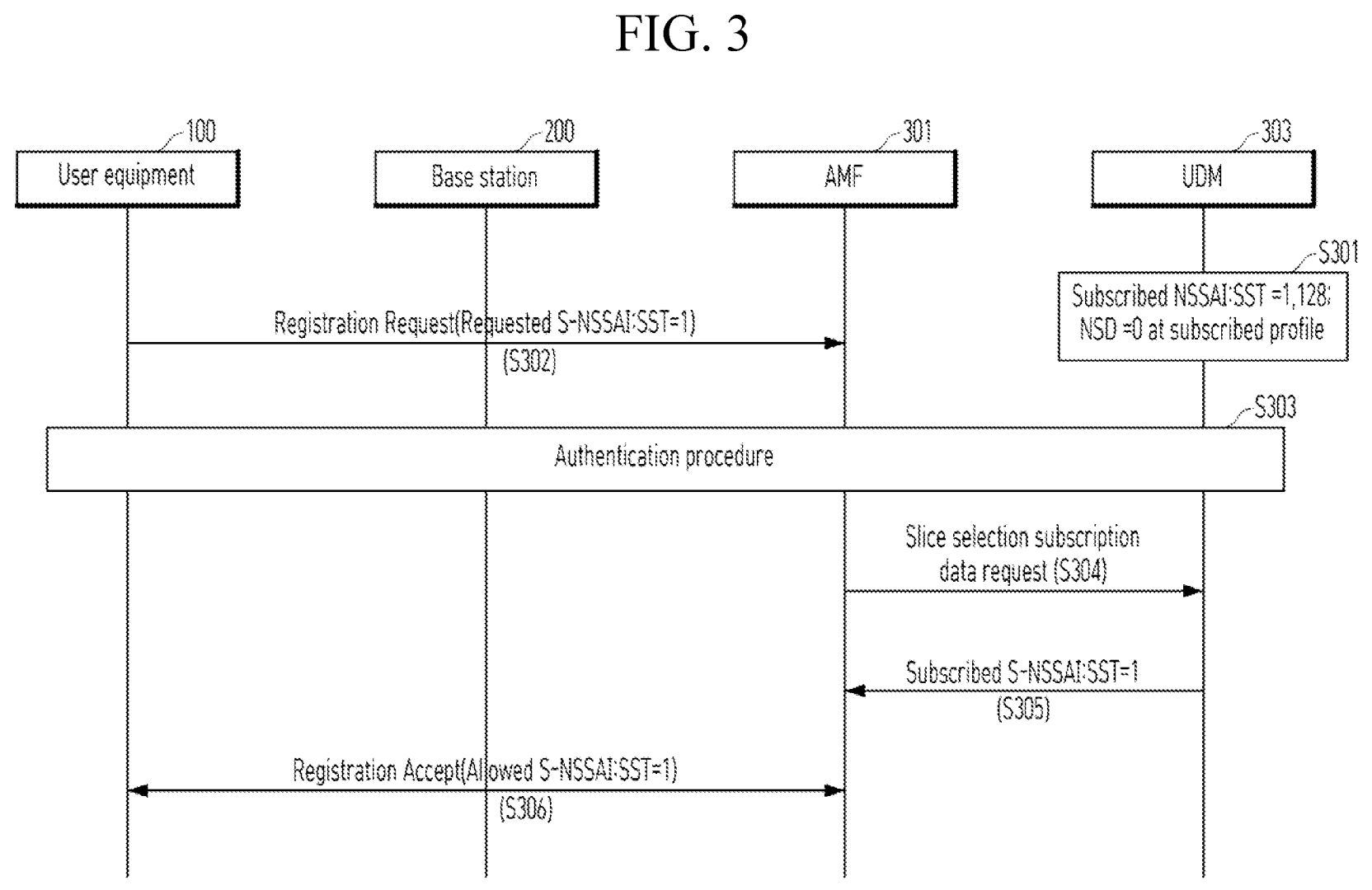

User equipment (100)

Base station (200)

AMF (301)

UDM (303)

Registration Request(Requested S-NSSAI:SST=1) (S302)

Authentication procedure (S303)

Subscribed NSSAI:SST =1,128; NSD =0 at subscribed profile (S301)

Slice selection subscription data request (S304)

Subscribed S-NSSAI:SST=1 (S305)

Registration Accept(Allowed S-NSSAI:SST=1) (S306)

Figure 8:
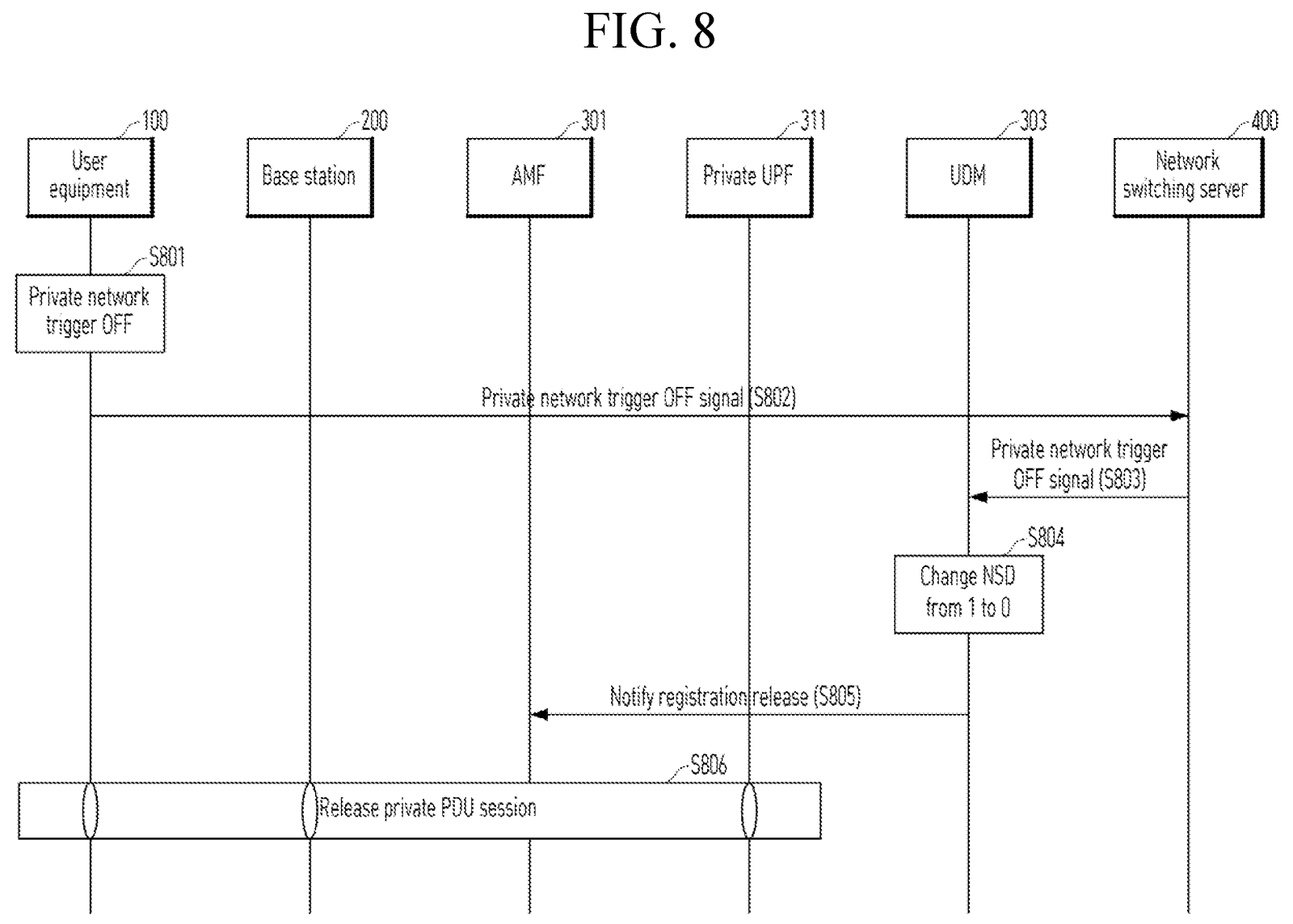

Network switching server 400

UDM 303

Private UPF 311

AMF 301

Base station 200

User equipment 100

Private network trigger OFF (S801)

Private network trigger OFF signal (S802)

Private network trigger OFF signal (S803)

Change NSD from 1 to 0 (S804)

Notify registration release (S805)

Release private PDU session (S806)

400

METHOD AND APPARATUS FOR PROVIDING NETWORK SWITCHING SERVICE IN 5G COMMUNICATION SYSTEM

BACKGROUND

The present disclosure relates to a method and apparatus for providing a network switching service in a 5G communication system. In particular, the present disclosure relates to a method and apparatus for providing a network switching service between a public network and a private network (e.g., private network) in a 5G stand along (SA) communication system.

The enterprise-exclusive 5G service provides customers with a dedicated 5G network (e.g., private 5G network) that is separate from the general 5G network (e.g., public 5G network). Such a specialized service ensures both user convenience and robust security for enterprise data all at once. Customers are allowed to subscribe to the enterprise-exclusive 5G dedicated line products based on their monthly data provision (from 300 GB to 200 TB). Company employees can join the enterprise-exclusive additional service products (e.g., 3M, 10M, 20M) and then access the private network (e.g., dedicated network). The currently released enterprise-exclusive 5G service is available not only to general 5G device users but also to general LTE device users, as they can also subscribe to the enterprise-exclusive 5G additional service products. This is because the 5G and LTE networks are currently intermixed and interconnected.

However, in the future, it is expected that the LTE network will be reduced. A standalone 5G network will be established, and services will be provided exclusively on this 5G network. The enterprise-exclusive 5G service will also be provided through a standalone 5G network (e.g., 5G SA network), without interconnection with the LTE network. Call processing in the 5G SA network for enterprise-exclusive 5G serviced is fundamentally different from call processing in the 5G NSA (Non-standalone) network, which is interconnected with the LTE network. Therefore, for enterprise-exclusive 5G service in the 5G SA network, a transition technology between the public network and the private network is needed.

SUMMARY

In accordance with an aspect of the present embodiment, a network switching service may be provided to enable switching between a public network and a private network (private network) in a 5G standalone (SA) communication system.

In accordance with another aspect of the present disclosure, a user equipment (e.g., user device) may be enabled to selectively access one of a public network and a private network (e.g., dedicated network) without modification of the user equipment in a 5G standalone (SA) communication network.

In accordance with further aspect of the present disclosure, an enterprise-exclusive 5G service may be provided with minimal system modification in a 5G standalone (SA) communication system.

In accordance with an embodiment, a method of a network apparatus may be provided for providing a network switching service for enabling a user equipment to switch a network by communicating with a subscriber apparatus that stores subscribed single (S)-NSSAI (Network Slice Selection Assistance Information) of the user equipment and a network selection discriminator (NSD) indicating a network selected by a user of the user equipment at a subscriber profile. The method may include receiving a registration request from the user equipment and transmitting a slice selection subscription data request to the subscriber apparatus; receiving subscribed S-NSSAI based on the network selection discriminator (NSD) from the subscriber apparatus; transmitting a registration response including allowed S-NSSAI based on the received subscribed S-NSSAI; and receiving a session establishment request including the allowed S-NSSAI from the user equipment and creating a session to one of a public network and a private network according to the allowed S-NSSAI included in the session establishment request.

The subscriber apparatus stores S-NSSAI for a public network and S-NSSAI for a private network as the subscribed S-NSSAI of the user equipment. In this case, the receiving subscribed S-NSSAI may include receiving S-NSSAI for the public network from the subscriber apparatus in an event that the network selection discriminator (NSD) indicates the public network, and the creating a session may include generating a session to the public network.

The subscriber apparatus may store S-NSSAI for a public network and S-NSSAI for a private network as the subscribed S-NSSAI of the user equipment. In this case, the receiving subscribed S-NSSAI may include receiving S-NSSAI for the private network from the subscriber apparatus in an event that the network selection discriminator indicates the private network; and the creating a session may include generating a session to the private network.

The S-NSSAI for the public network and the S-NSSAI for the private network may be identified by a slice service type (SST).

The network selection discriminator of the subscriber apparatus may be changed to one of i) an identifier for a public network and ii) an identifier for a private network according to a trigger signal from the user equipment.

The method may further include receiving a registration release notification from the subscriber apparatus according to the change of the network selection discriminator; and releasing the session of the user equipment.

In accordance with another embodiment, a method of a network apparatus may be provided for providing a network switching service to user equipment for switching a communication network between a private network and a public network. The method may include transmitting a slice selection subscription data request to a subscription apparatus upon receiving of a registration request from the user equipment; in response to the slice selection subscription data request, receiving subscribed Network Slice Selection Assistance Information (NSSAI) from the subscriber apparatus and default NSSAI; and including allowed NSSAI in a registration response and transmitting the registration response to the user equipment.

The default NSSAI may be determined based on a network selection discriminator (NSD) stored in a subscriber profile of the user equipment, and the network selection discriminator (NSD) is set to have one of values 0 and 1, each indicates the public network and the private network, respectively.

The network selection discriminator may be changed from 0 to 1 or from 1 to 0 upon receiving a trigger signal for switching a communication network from the user equipment.

The allowed NSSAI may have at least one value indicating at least one allowed network to access which is determined based on values included in the received subscribed NSSAI.

The allowed NSSAI included in the registration response may have two values one indicating the public network and the other indicating the private network.

The method may further include: receiving a session establishment request including subscribed NSSAI from the user equipment; selecting one of the public network and the private network based on values included in the allowed S-NSSAI in the session establishment request; and creating a session to the selected one.

The selecting may include: determining whether the subscribed NSSAI has a Null value; identifying a value included in the default NSSAI which is received in response to the slice selection subscription data request; and selecting one of the public network and the private network based on the identified value of the default NSSAI.

The receiving subscribed NSSAI from the subscriber apparatus and default NSSAI may include: receiving Nudm_5DM_Get_Response from the subscription apparatus, including subscribed NSSAI that has values one indicating the public network and the other indicating the private network.

In accordance with further still another embodiment, a network apparatus may be provided for providing a network switching service to user equipment for switching a communication network between a private network and a public network. The network apparatus may include: a memory configured to store data including subscribed network slice selection assistance information (NSSAI) and default NSSAI; a communication circuit configured to communicate with other entities including a subscription apparatus, a service server, and the user equipment through a communication network; a processing circuit configured to perform at least one of: transmitting a slice selection subscription data request to a subscription apparatus upon receiving of a registration request from the user equipment; in response to the slice selection subscription data request, receiving sub scribed Network Slice Selection Assistance Information (NSSAI) from the subscriber apparatus and default NSSAI; and including allowed NSSAI in a registration response and transmitting the registration response to the user equipment.

BRIEF DESCRIPTION OF THE DRAWINGS

FIG. 3 is a flowchart illustrating an initial registration procedure for accessing a public network in accordance with an embodiment.

FIG. 5 is a flowchart illustrating an access release procedure for release access to public network according to a private network access trigger in accordance with an embodiment.

FIG. 8 is a flowchart illustrating a private network access release procedure according to a trigger OFF signal of a user equipment in accordance with an embodiment.

DETAILED DESCRIPTION OF EMBODIMENTS

In accordance with an aspect of the present embodiment, a network switching service may be provided to enable switching between a public network and a private network (private network) in a 5G standalone (SA) communication system.

In accordance with another aspect of the present disclosure, a user equipment (e.g., user device) may be enabled to selectively access one of a public network and a private network (e.g., dedicated network) without modification of the user equipment in a 5G standalone (SA) communication network.

In accordance with further aspect of the present disclosure, an enterprise-exclusive 5G service may be provided with minimal system modification in a 5G standalone (SA) communication system.

In accordance with still another aspect of the present disclosure, i) network slice selection assistance information (NSSAI) defined in 5G SA standards and ii) network selection discriminator (NSD) defined for the present disclosure may be used to perform switching between public network 500 and private network 600 in accordance with an embodiment.

Hereinafter, a method and apparatus for providing a network switching service between a public network and a private network in accordance with an embodiment will be described with reference to the accompanying drawings.

Figure 1:
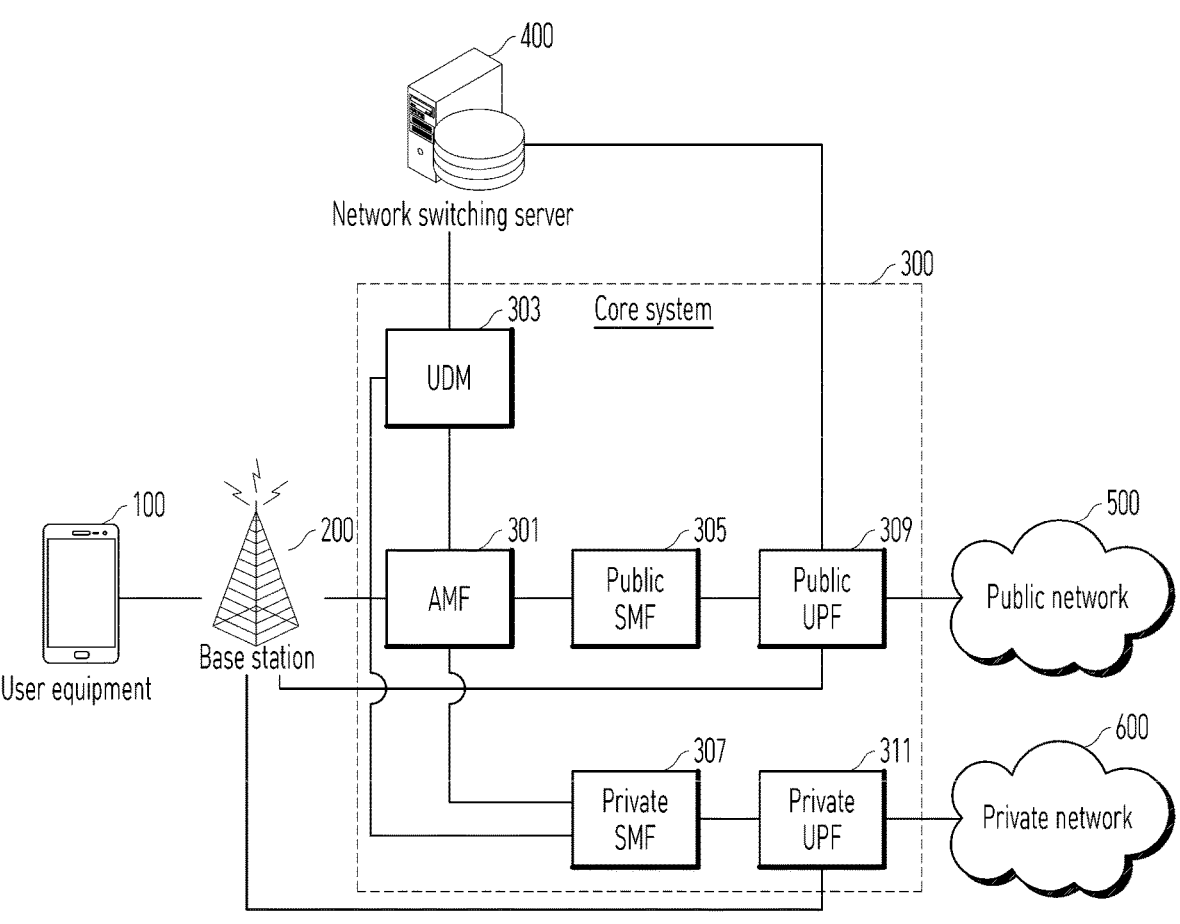
FIG. 1 is a diagram illustrating a system for providing a network switching service in accordance with an embodiment.

FIG. 1 illustrates a 5G communication system (e.g., 5G standalone (SA) network) for providing a network switching service between a public network and a private network in accordance with an embodiment.

Referring to FIG. 1, the 5G communication system may include user equipment 100, base station 200, core system 300, public network 500 and private network 600.

User equipment 100 may be a device able to use a 5G communication system. User equipment 100 may be referred to as a mobile station, a mobile terminal, a subscriber station. Accordingly, user equipment 100 may be any device capable of communicating with other devices through a 5G communication network. For example, user equipment 100 may be a smartphone, a table, a laptop computer, and a personal computer.

Base station 200 may be user equipment 100's access point to core system 300. Base station 200 may be referred to as a radio access network (RAN), an access point (AP), or gNB.

In accordance with an embodiment, user equipment 100 may be able to selectively access one of public network 500 and private network 600. User equipment 100 may include a dedicated application for accessing private network 600. A user may trigger access to or release from private network 600 using the dedicated application. The trigger event may be automatically invoked according to a user's location or manually invoked in response to or by a user input.

User equipment 100 may be composed of hardware that includes a memory, storage device, display, input circuit, communication circuit, and at least one processor. Various programs, which include a dedicated application executed in conjunction with the hardware, are stored in the memory or storage device. The hardware possesses the configuration and performance capable of executing the configurations and/or methods described below. At this point, the display and input device may be implemented as single device. That program contains instructions that can execute the configurations and/or methods described below.

Core system 300 may be a core network to provide a 5G communication service. Core system 300 may include a core system for a public network and a core system for a private network. The core system for the public network may include access and mobility function (AMF) 301, user data management (UDM) 303, common session management function (SMF) 305, common user plane function (UPF) 309. The core system for the private network may include private SMF 307 and private UPF 311. Here, UDM 303 may be implemented to be used in both the public network and the private network or to be separately to be used in each of the public network and the private network.

Each network device of the core system may include a communication circuit, memory, storage device, and at least one processor. For example, each network device of the core system may be a computer system, but the embodiments are not limited thereto. The communication circuit is connected to at least one processor and transmits and/or receives data with an external network. The memory is connected to at least one processor and stores a program containing instructions that execute configurations and/or methods described below. The program is implemented in conjunction with hardware such as memory and at least one processor to realize the embodiments of the present disclosure. The storage device contains information necessary for the operation or action of the network device. The processor operates this invention in combination with hardware such as memory and storage devices.

AMF 301 is a mobility management device that manages access and mobility of user equipment 100 through non access stratum (NAS) signaling.

SMF 305 or 307 may be a session management device that i) creates a session for connecting user equipment 100 and public network 500 or a session for connecting user equipment 100 and private network 600, ii) manages the created session, and iii) allocates an IP address to user equipment 100 to be used at a network.

UPF 309 or 311 may be a data gateway device that i) transfer downlink packet data unit (PDU) data to user equipment 100 through sessions connected to public network 500 or private network 600 and deliver uplink PDU data to PDN.

UDM 303 may be a subscription device that i) stores and manages subscription and registration information of user equipment 100, ii) registers a location of user equipment 100, and iii) authenticates a subscriber. UDM 303 may include an application front-end and a user data repository (UDR).

Network switching server 400 may be connected to user equipment 100 through base station 200 and UPF 309 and 311. Network switching server 400 may receive a trigger signal for switching a network from user equipment 100 and controlling switching network between public network 500 and private network 600 according to the trigger signal. For example, the trigger signal for switching network may be relayed to network switching server 400 through a circuit-switched path or a WiFi network path. Network switching server 400 may receive the trigger signal for switching network from user equipment 100 and transmit the received trigger signal to UDM 303.

Public network 500 is a general network accessible to the general public, also known as the Internet. Private network 600 may be a network where external access is allowed only for specific subscribers. Private network 600 may be referred to as a dedicated network, a corporate network, an internal network, or Intranet.

Public network 500 and private network 600 represent separate traffic paths. However, public network 500 and private network 600 do not necessarily have to be physically separate. For example, public network 500 and private network 600 may be different bearers created on the same physical path.

In the specification, i) network slice selection assistance information (NSSAI) defined in 5G SA standards and ii) network selection discriminator (NSD) defined for the present disclosure may be used to perform switching between public network 500 and private network 600 in accordance with an embodiment.

NSSAI is a parameter defined in 5G standards. User equipment 100 may use NSSAI to select a specific network slice for call processing. NSSAI is composed of two fields: i) a slice service type (SST) and ii) a slice differentiator (DS). SST may include one of values among 0 to 155 and indicates a slice service type such as enhanced mobile broadband (eMBB), ultra reliable low latency comm (URLLC), or massive IoT (MIoT). It is defined with values ranging from 0 to 155, where values 0 to 127 are defined by the 5G standard, and values 128 to 155 may be determined by the telecommunication service providers. SD is used for slice differentiation and is defined as hexadecimal H'FFFFFF, a value that may be determined by the telecommunication service provider. NSSAI is composed of a collection of one or more S-NSSAIs (single NSSAIs). as shown in Table 1 below.

In accordance with an embodiment, i) SST may be set to 1 for access services on public network 500, or ii) SST may be set to 128 for access services on private network 600. In accordance with an embodiment, SD is defined as Null.

Table 1 and Table 2 below show examples of SSTs defined by 5G standards and a 5G communication service provider.

TABLE 1

| SST | Service type | Service Characters |
|-----|-------------|-------------------|
| 1 | eMBB (enhanced Mobile Broadband) | Ultra-High speed, large capacity |
| 2 | URLLC (Ultra Reliable Low Latency Comm) | Ultra-low latency, high reliability |
| 3 | MIOT (Massive IoT) | Largescale fixed terminal, battery saving |
| 4 | V2X (Vehicle to everything) | Mobile connectivity |
| 128 | Enterprise 5G eMBB | Enterprise customer high speed, large capacity |
| 129 | Enterprise 5G URLLC | Ultra-low latency, high reliability |
| 130 | Enterprise 5G MIOT | Largescale fixed terminal, battery saving |
| 131 | Enterprise 5G V2X | Mobile connectivity |

TABLE 2

| SD | Specialized purpose |
| --- | --- |
| NULL | Service provide slice |
| H'000000 | 5G national network dedicated slice |
| H'000001 | 5G defense network dedicated slice |

Figure 9:
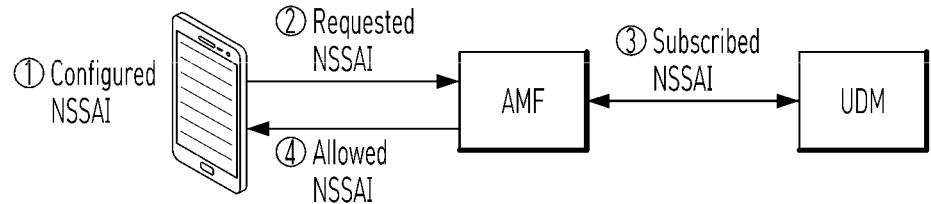
FIG. 9 is a diagram for explaining different types of S-NSSAIs in accordance with an embodiment.

NSSAI or S-NSSAI may be categorized into four types depending on its purpose: Configured S-NSSAI, Requested S-NSSAI, Subscribed S-NSSAI, and Allowed S-NSSAI. FIG. 9 is a diagram for explaining different types of S-NS-SAIs in accordance with an embodiment. Referring to FIG. 9, Configured S-NSSAI (1) may be the S-NSSAI that is pre-configured by user equipment 100. Requested S-NSSAI (2) is the S-NSSAI that user equipment 100 NSD to the network when it connects to request services. Subscribed S-NSSAI (3) is the S-NSSAI that is managed in the subscriber profile stored in UDM 303. Allowed S-NSSAI (4) is the S-NSSAI that AMF 301 allows for user equipment 100, which is a combination of Subscribed S-NSSAI (3) from the subscriber profile and Requested S-NSSAI (2) that user equipment 100 NSD when requesting services.

In accordance with an embodiment, if user equipment 100 may be capable of only connecting to public network 500, Subscribed S-NSSAI with SST 1 is stored in the subscriber profile in UDM 303. Hereinafter, SST 1 means the value of SST is 1, SST 128 means the value of SST 128. If user equipment 100 may be capable of connecting to either public network 500 or private network 600, Subscribed S-NSSAI with SST 1 and 128 may be stored in the subscriber profile in UDM 303. Hereafter, SST 1 and 128 means SST has values of 1 and 128.

In accordance with an embodiment, a newly defined network selection discriminator (NSD) may be set in UDM 303 based on user equipment 100's choice of connecting to either public network 500 or private network 600. NSD is information not defined in 5G SA standards. In accordance with an embodiment, when user equipment 100 chooses to connect to public network 500, NSD is set to 0. When user equipment 100 chooses to connect to private network 600, NSD is set to 1. That is if user equipment 100 triggers a connection to public network 500, NSD in the subscriber profile stored in UDM 303 is set to 0. Conversely, if user equipment 100 triggers a connection to private network 600, NSD in the subscriber profile stored in UDM 303 is set to 1.

In summary, the subscriber profile in UDM 303 stores a Subscribed S-NSSAI with SST 1 and 128 for user equipment 100 that is capable of selectively connecting to either public network 500 or private network 600. Additionally, NSD of either 0 or 1 may be stored depending on the type of network currently selected by user equipment 100. On other words, subscribed S-NSSAI with SST 1 and 128 is fixedly stored in the subscriber profile in UDM 303, and NSD changes from 0 to 1 or from 1 to 0 based on the network currently selected by user equipment 100.

During the initial registration procedure of user equipment 100 to access public network 500 or private network 600, UDM 303 may receive a request for slice selection subscription data (e.g., subscription information) for user equipment 100 from AMF 301. In accordance with a first embodiment, UDM 303 may transmit Subscribed S-NSSAI with SST 1 or 128, which is stored in a subscriber profile of user equipment 100 and determined based on the value of NSD, to AMF 301 in accordance with an embodiment. In accordance with a second embodiment, UDM 303 may transmit Subscribed S-NSSAI with SST 1 and 128, which is stored in a subscriber profile of user equipment 100, and a default S-NSSAI with SST determined based on the value of NSD to AMF 301 in accordance with another embodiment.

During the initial registration procedure of user equipment 100 to access public network 500 or private network 600, AMF 301 may perform authentication on user equipment 100. After completion of authentication, AMF 301 may request a slice selection subscription data (e.g., subscription information) of user equipment 100 to UDM 303. In accordance with the first embodiment, in response to the request, UDM 303 may transmit Subscribed S-NSSAI with SST 1 or 128, determined based on the value of NSD, to AMF 301. In the first embodiment, AMF 301 may transmit Allowed S-NSSAI with SST 1 or 128 to user equipment 100, which is determined according to the received Subscribed S-NS-SAI with SST 1 or 128 from UDM 303. In accordance with the second embodiment, UDM 303 may transmit Subscribed S-NSSAI with SST 1 and 128 and a default S-NSSAI determined based on the value of NSD. In the second embodiment, AMF 301 may transmit Allowed S-NSSAI with SST 1 and 128 to user equipment 100.

After the completion of the initial registration procedure of user equipment 100, AMF 301 may receive a PDU session establishment request for accessing one of public network 500 and private network 600 from user equipment 100. In accordance with the first embodiment, PDU session establishment request may include S-NSSAI with SST 1 or SST 128 according to the Allowed S-NSSAI with SST 1 or SST 128. For example, in an event that user equipment 100 receives Allowed S-NSSAI with SST 1, user equipment 100 may include S-NSSAI with SST 1 in the PDU session establishment request. In an event that user equipment 100 receives Allowed S-NSSAI with SST 128, user equipment 100 may include S-NSSAI with SST 128 in the PDU session establishment request. AMF 301 may select one of public SMF 305 or dedicated SMF 307 according to S-NSSAI with SST 1 or SST 128 included in the PDU session establishment request and establish a PDU session according to the selected SMF.

In accordance with the second embodiment, PDU session establishment request may include S-NSSAI with SST Null because user equipment 100 received Allowed S-NSSAI with two values, 1 and 128, of SST so user equipment 100 does not know how to set the value of SST of Request S-NSSAI. In the second embodiment, AMF 301 may select one of public SMF 305 or dedicated SMF 307 according to the value of SST of the default S-NSSAI and establish a PDU session with the selected SMF.

Figure 2:
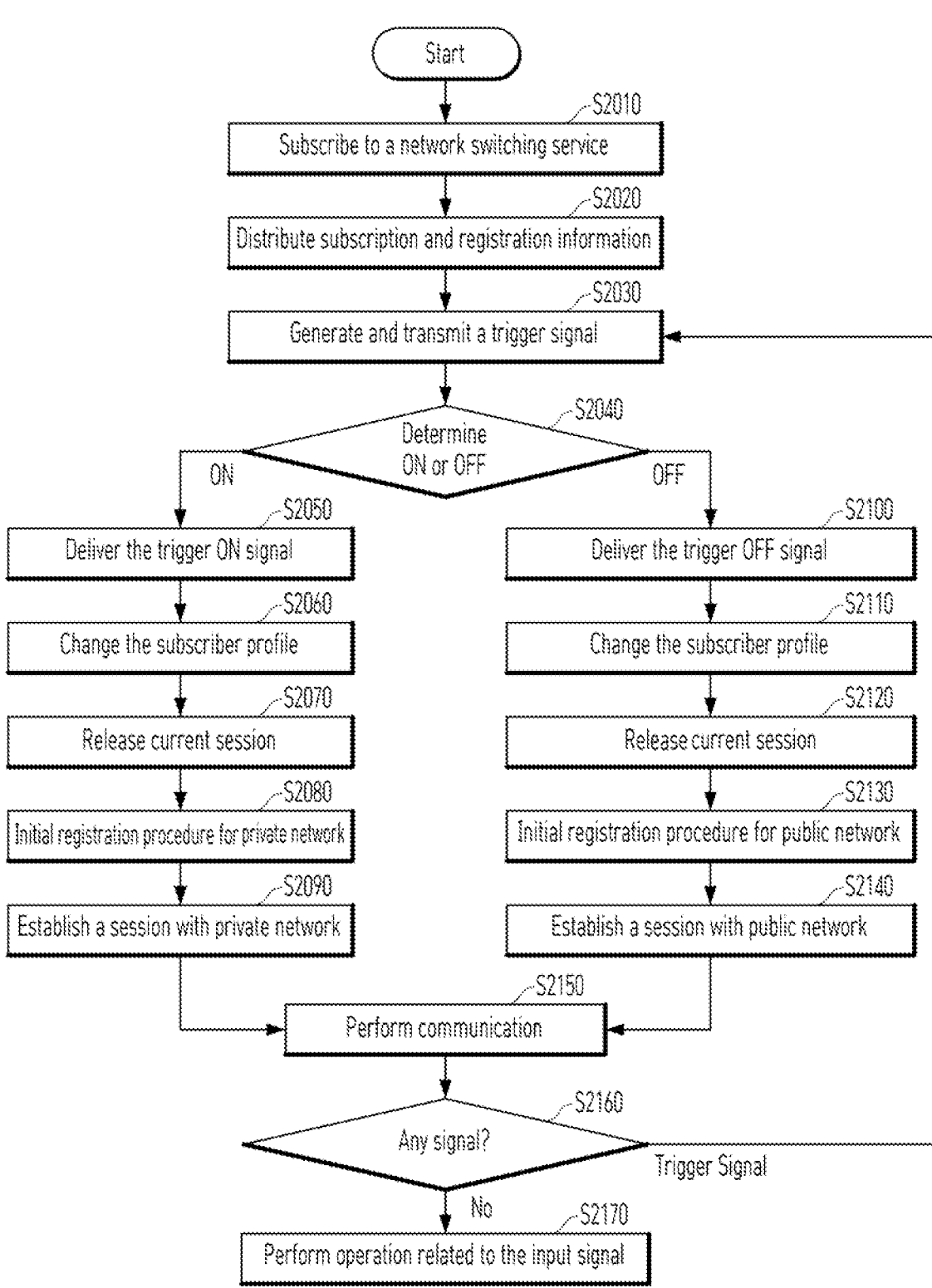
FIG. 2 illustrates a method for providing a network switching service in accordance with an embodiment.

Hereinafter, a method for providing a network switching service in accordance with an embodiment will be described with reference to FIG. 2. FIG. 2 illustrates a method for providing a network switching service in accordance with an embodiment.

Referring to FIG. 2, a network switching service may be subscribed to and user information may be registered at step S2010 in accordance with an embodiment. For example, user equipment 100 subscribes to a network switching service and registers itself at server at step S2010. Such a subscription and registration procedure may be performed through a dedicated app installed in user equipment 100 or a dedicated website. Such a dedicated app or a dedicated web site may be provided by a service provider (e.g., telecommunication service provider) or network switching server 400. In case of a dedicated app, the dedicated app may be downloaded and installed in user equipment 100, and the dedicated app may be executed in response to a predetermined user input and provide a graphic user interface that enables a user to subscribe to the network switching service and register identification information of user equipment 100 at network switching server 400. Such a subscription and registration may be performed by accessing the dedicated website and entering necessary information (e.g., identification information of user equipment 100) to the website. However, the subscription and registration procedure are not limited to the described methods.

In accordance with an embodiment, upon subscribing to the network switching service, network switching server 400 may set up a corresponding S-NSSAI as Subscribed S-NSSAI with SST 1 and 128. Such subscription information (e.g., slice selection subscription data) may be mapped with identification of corresponding user equipment 100. That is, network switching server 400 may create subscription and registration information including Subscribed S-NSSAI with SST 1 and 128 and identification information of corresponding user equipment 100.

At step S2020, subscription and registration information may be distributed to internal nodes of 5G communication network in accordance with an embodiment. For example, network switching server 400 may distribute the subscription and registration information of user equipment 100 to internal nodes of 5G communication network. Network switching server 400 may provide subscription and registration information to UDM 303. UDM 303 stores the received subscription and registration information to a subscriber profile of corresponding user equipment. For example, when user equipment 100 subscribes to the network switching serviced, UDM 303 stores S-NSSAI with SST 1 and 128 in the corresponding subscriber profile.

At step S2030, a trigger signal may be generated and transmitted in accordance with an embodiment. For example, a user of user equipment 100 may turn on a trigger for accessing private network 600 on a dedicated application of user equipment 100. As another example, when user equipment 100 enters a predetermined area or leaves a predetermined area, user equipment 100 may automatically generate the trigger ON signal or the trigger OFF signal, respectively. That is, when user equipment 100 meets certain conditions, the trigger ON signal or the trigger OFF signal may be automatically generated and transmitted.

User equipment 100 may transmit a trigger ON signal for accessing private network to network switching server 400 through the public PDU session created between user equipment 100 and public UPF 309. For another example, a user of user equipment 100 may turn off a trigger for accessing private network 600 at the dedicated application of user equipment 100. In this case, user equipment 100 may transmit a trigger OFF signal for releasing access of private network 600 to network switching server 400 through the dedicated PDU session created between user equipment 100 and dedicated UPF 311.

At step S2040, determination may be made whether the received signal is a trigger ON signal or a trigger OFF signal. For example, network switching server 400 may determine whether the received trigger signal is a trigger ON signal or a trigger OFF signal.

In case of the trigger ON signal (ON-S2040), the trigger ON signal may be delivered to UDM at step S2050. For example, network switching server 400 may transmit the received trigger ON signal to UDM 303.

At step S2060, the subscriber profile may be changed. For example, UDM 303 may change the value of NSD at the subscriber profile of user equipment 100 according to the receipt of the trigger ON signal for accessing private network 600. That is, UDM 303 changes the value of NSD from 0 to 1. As described, NSD (network selection discriminator) is newly defined in accordance with an embodiment. NSD may be set in UDM 303 based on user equipment 100's choice of connecting to either public network 500 or private network 600. When user equipment 100 chooses to connect to public network 500, NSD is set to 0. When user equipment 100 chooses to connect to private network 600, NSD is set to 1. That is if user equipment 100 triggers a connection to public network 500, NSD in the subscriber profile stored in UDM 303 is set to 0. Conversely, if user equipment 100 triggers a connection to private network 600, NSD in the subscriber profile stored in UDM 303 is set to 1.

At step S2070, PDU session for a public network may be released. For example, UDM 303 may transmit a registration release notification for releasing the public PDU session to AMF 301 according to the change of NSD in the subscriber profile of user equipment 100. Here, the registration release notification may be EUCM Deregistration Notification. Then, AMF 301 may perform the public PDU session release procedure between the user equipment 100 and the public UPF 309 upon the receipt of the registration release notification.

At step S2080, initial registration procedure for accessing the private network may be performed. Such an initial registration procedure for accessing the private network may be performed through the following two embodiments. In accordance with a first embodiment, user equipment 100 may include Requested S-NSSAI with SST 128 in a registration request for accessing private network 600 and transmit the registration request to AMF 301 through base station 200. AMF 301 may perform authentication procedure on user equipment 100. After completing the authentication procedure, AMF 301 may transmit a slice selection subscription data request to UDM 303. The slice selection subscription data request may be Nudm_SDM_Get message. In response to the slice selection subscription data request, UDM 303 may transmit Subscribed S-NSSAI with SST 128 to AMF 301. Upon the receipt of Subscribed S-NSSAI with SST 128, AMF 301 may include Allowed S-NSSAI with SST 128 in a registration accept because of the received Subscribed S-NSSAI with SST 128 and transmit the registration accept to user equipment 100. User equipment 100 may change Configured S-NSSAI with SST 1 to Configured S-NSSAI with SST 128 because user equipment 100 received Allowed S-NSSAI with SST 128.

In accordance with a second embodiment, user equipment 100 may include Requested S-NSSAI with SST 1 and 128 in a registration request for accessing private network 600 because Configured S-NSSAI of user equipment 100 is updated with Allowed S-NSSAI with SST 1 and 128 which is received for previous initial registration procedure for accessing a public network. Then, user equipment 100 transmit the registration request to AMF 301 through base station 200. AMF 301 may perform authentication procedure on user equipment 100. After completing the authentication procedure, AMF 301 may transmit a slice selection subscription data request to UDM 303. The slice selection subscription data request may be Nudm_SDM_Get message. UDM 303 may transmit Subscribed S-NSSAI with SST 1 and 128 and a default S-NSSAI with SST 128 to AMF 301. The default S-NSSAI with SST 128 may be determined based on the value of NSD by UDM 303 and transmitted to AMF 301. Upon the receipt of Subscribed S-NSSAI with SST 1 and 128, AMF 301 may include Allowed S-NSSAI with SST 1 and 128 in a registration accept and transmit the registration accept to user equipment 100.

At step S2090, a PDU session to a private network may be established. Such PDU session establishment may be performed by the following two embodiments. In accordance with a first embodiment, since user equipment 100 stores Configured S-NSSAI with SST 128, user equipment 100 may include S-NSSAI with SST 128 and DNN as Private network in the PDU session establishment request and transmit the PDU session establishment request. AMF 301 may select private SMF 307 because SST of S-NSSAI included in the PDU session establishment request is 128. AMF 301 may transmit a session create request to SMF 307. The session create request may be PDU Session Create SM Context Request. Then, private SMF 307 may create a dedicated PDU session between user equipment 100 and private UPF 311 in cooperation with UDM 303, AMF 301, and dedicated UPF 311. User equipment 100 may create the dedicated PDU session with private UPF 311 and access private network 600.

In accordance with a second embodiment, since user equipment 100 stores Configured S-NSSAI with SST 1 and 128, user equipment 100 may include S-NSSAI with Null and DNN as internet in the PDU session establishment request and transmit the PDU session establishment request. AMF 301 may select private SMF 307 because of the default S-NSSAI with SST 128 which was received in the initial registration procedure. AMF 301 may transmit a session create request to SMF 307. The session create request may be PDU Session Create SM Context Request. Then, private SMF 307 may create a dedicated PDU session between user equipment 100 and private UPF 311 in cooperation with UDM 303, AMF 301, and dedicated UPF 311. User equipment 100 may create the dedicated PDU session with private UPF 311 and access private network 600.

At step S2150, communication may be performed through the established session. For example, user equipment 100 communicates with another device through the established private network session.

At step S2160, determination may be made whether to receive another signal or not. Upon receipt of a signal, it is determined whether the received signal is a trigger signal or not. When the received signal is the trigger signal (Tigger signal-S2160), it is determined whether the received trigger signal is a trigger ON signal or a trigger OFF signal ats step S2040. When the received signal is not the trigger signal (No-S2016), operations related to the received signal may be performed at step S2170.

In case of the trigger OFF signal (OFF-S2040), the trigger OFF signal may be delivered to UDM 303 at step S2100. For example, network switching server 400 may transmit the trigger OFF signal for releasing access to private network 600, which is received from user equipment 100, to UDM 303.

At step S2110, the subscriber profile may be changed. For example, UDM 303 may set the value of NSD at the subscriber profile of user equipment 100 from 1 to 0 for releasing connection of private network 600.

At step S2120, PDU session for public network may be released. For example, UDM 303 may transmit registration release notification for releasing of dedicated PDU session to AMF 301 according to the change of NSD in the subscriber profile of user equipment 100. Here, the registration release notification is EUCM Deregistration Notification. AMF 301 may perform a dedicated PDU session release procedure according to the receipt of the registration release notification.

At step S2130, initial registration procedure for public network may be performed. As described, such an initial registration procedure may be performed by the following two embodiments. In accordance with a first embodiment, user equipment 100 includes Requested S-NSSAI with SST 1 in the registration request based on Configured S-NSSAI with SST 1, stored in user equipment 100. AMF 301 may perform authentication on user equipment 100. Such an authentication operation may be performed with authentication server function (AUSF). After the completion of authentication on user equipment 100, AMF 301 may transmit a slice selection subscription data request to UDM 303. Such a slice selection subscription data request may be Nudm_SDM_Get message. UDM 303 may transmit Subscribed S-NSSAI with SST 1 for accessing public network 500 to AMF 301 because Subscribed NSSAAI with SST 1 is stored at the subscriber profile of user equipment and NSD is setup as 0. AMF 301 may include Allowed S-NSSAI with SST 1 to a registration accept based on the received subscribed S-NSSAI with SST 1 from UDM 303 and transmit the Allowed S-NSSAI with SST 1 to user equipment 100. Because user equipment 100 receives the Allowed S-NSSAI with SST 1, user equipment 100 maintains the Configured NSSAI with SST 1 as it is.

In accordance with a second embodiment, user equipment 100 includes Requested S-NSSAI with SST 1 in the registration request based on Configured S-NSSAI with SST 1, stored in user equipment 100. AMF 301 may perform authentication on user equipment 100. Such an authentication operation may be performed with authentication server function (AUSF). After the completion of authentication on user equipment 100, AMF 301 may transmit a slice selection subscription data request to UDM 303. Such a slice selection subscription data request may be Nudm_SDM_Get message. UDM 303 may transmit Subscribed S-NSSAI with SST 1 and 128 and a default S-NSSAI with SST 1 for accessing public network 500 to AMF 301. The default S-NSSAI with SST 1 may be decided by the value of network selection discriminator (NSD). For example, when NSD value is 0, SST value is decided as 1 for accessing a public network, and when NSD value is 1, SST value is decided as 0 for accessing a private network. AMF 301 may include Allowed S-NSSAI with SST 1 and 128 to a registration accept and transmit the Allowed S-NSSAI with SST 1 and 128 to user equipment 100. AMF 301 may include Allowed S-NSSAI with SST 1 and 128 to a registration accept and transmit the Allowed S-NSSAI with SST 1 and 128 to user equipment 100.

At step S2140, a PDU session for public network may be established. Such PDU session establishment may be performed through two embodiments. In accordance with a first embodiment, user equipment 100 may include S-NSSAI with SST 1 and Internet as DNN in a PDU session establishment request and transmit the PDU session establishment request to AMF 301 through base station 200. AMF 301 may select public SMF 305 because SST of S-NSSAI included in the PDU session establishment request is 1. AMF 301 may transmit a session create request to public SMF 305. For example, the session create request is PDU Session Create SM Context Request. Public SMF 305 may create a public PDU session between user equipment 100 and public UPF 309 in cooperation with UDM 303, AMF 301, and public UPF 309. User equipment 100 may create the public PDU session with public UPF 309 and use a data service through public network 500.

In accordance with a second embodiment, user equipment 100 may include S-NSSAI with SST: Null and DNN as internet in a PDU session establishment request and transmit the PDU session establishment request to AMF 301 through base station 200. AMF 301 may select public SMF 305 because of the default S-NSSAI with SST 1 which was received in the initial registration procedure. AMF 301 may transmit a session create request to public SMF 305. For example, the session create request is PDU Session Create SM Context Request. Public SMF 305 may create a public PDU session between user equipment 100 and public UPF 309 in cooperation with UDM 303, AMF 301, and public UPF 309. User equipment 100 may create the public PDU session with public UPF 309 and use a data service through public network 500.

At step S2150, communication may be performed through the established session. For example, user equipment 100 may communicate with another device through the public PDU session.

At step S2160, determination may be made whether to receive another signal or not. Upon receipt of a signal, it is determined whether the received signal is a trigger signal or not. When the received signal is the trigger signal (Tigger signal-S2160), it is determined whether the received trigger signal is a trigger ON signal or a trigger OFF signal ats step S2040. When the received signal is not the trigger signal (No-S2016), operations related to the received signal may be performed at step S2170.

Hereinafter, each operation of FIG. 2 will be detailed with reference to FIG. 3 to FIG. 8. As an example, a procedure of user equipment 100 that accesses public network 500 and switches public network 500 to private network 600 in accordance with an embodiment will be described with reference to FIG. 3 to FIG. 8.

FIG. 3 is a flowchart illustrating an initial registration procedure for accessing a public network in accordance with an embodiment.

Referring to FIG. 3, in an event that a user of user equipment 100 subscribes to a network switching service or a private network service, UDM 303 may store Subscribed S-NSSAI with SST 1 and 128 at a subscriber profile of user equipment 100 and sets up a network selection discriminator (NSD) as 0 at step S301. Since it is a profile setup for an initial subscription, the network selection discriminator (NSD) is setup as 0, which means accessing public network 500. That is, the initial access of user equipment 100 is set up as access to public network 500 in accordance with an embodiment.

At step S302, user equipment 100 may transmit a registration request to AMF 301 through base station 200. User equipment 100 may include Requested S-NSSAI with SST 1 in the registration request because Configured S-NSSAI with SST 1.

At step S303, AMF 301 may perform authentication on user equipment 100. The authentication on user equipment 100 may be performed either following established protocols in 5G SA based communication system or adhere to the telecommunication service provider's design. Accordingly, the detailed description thereof will be omitted herein.

After the completion of authentication on user equipment 100, AMF 301 may transmit a slice selection subscription data request to UDM 303 at step S305. In accordance with an embodiment, such a slice selection subscription data request may be Nudm_SDM_Get message.

At step S305, UDM 303 may transmit Subscribed S-NSSAI. In accordance with the first embodiment, UDM 303 may transmit Subscribed S-NSSAI with SST 1 to AMF 301 because Subscribed NSSAAI with SST 1 and 128 is stored at the subscriber profile of user equipment, and the network selection discriminator (NSD) is setup as 0. In accordance with the second embodiment, UDM 303 may transmit Subscribed S-NSSAI with SST 1, 128 and a default S-NSSAI 128 In the second embodiment, the default S-NSSAI with SST 1 may be decided according to the value of the network selection discriminator (NSD), which is 0.

At step S306, AMF 301 may transmit a registration accept to user equipment 100. In accordance with the first embodiment, AMF 301 may include Allowed S-NSSAI with SST 1 to the registration accept based on the received subscribed S-NSSAI with SST 1 from UDM 303 and transmit the Allowed S-NSSAI with SST 1 to user equipment 100. In the first embodiment, because user equipment 100 receives the Allowed S-NSSAI with SST 1, user equipment 100 maintains the Configured S-NSSAI with SST 1 as it is. In the second embodiment, AMF 301 may include Allowed S-NSSAI with SST 1 and 128 to the registration accept based on the received subscribed S-NSSAI with SST 1 and 128 from UDM 303 and transmit the Allowed S-NSSAI with SST 1 and 128 to user equipment 100 in accordance with the second embodiment.

Figure 4:
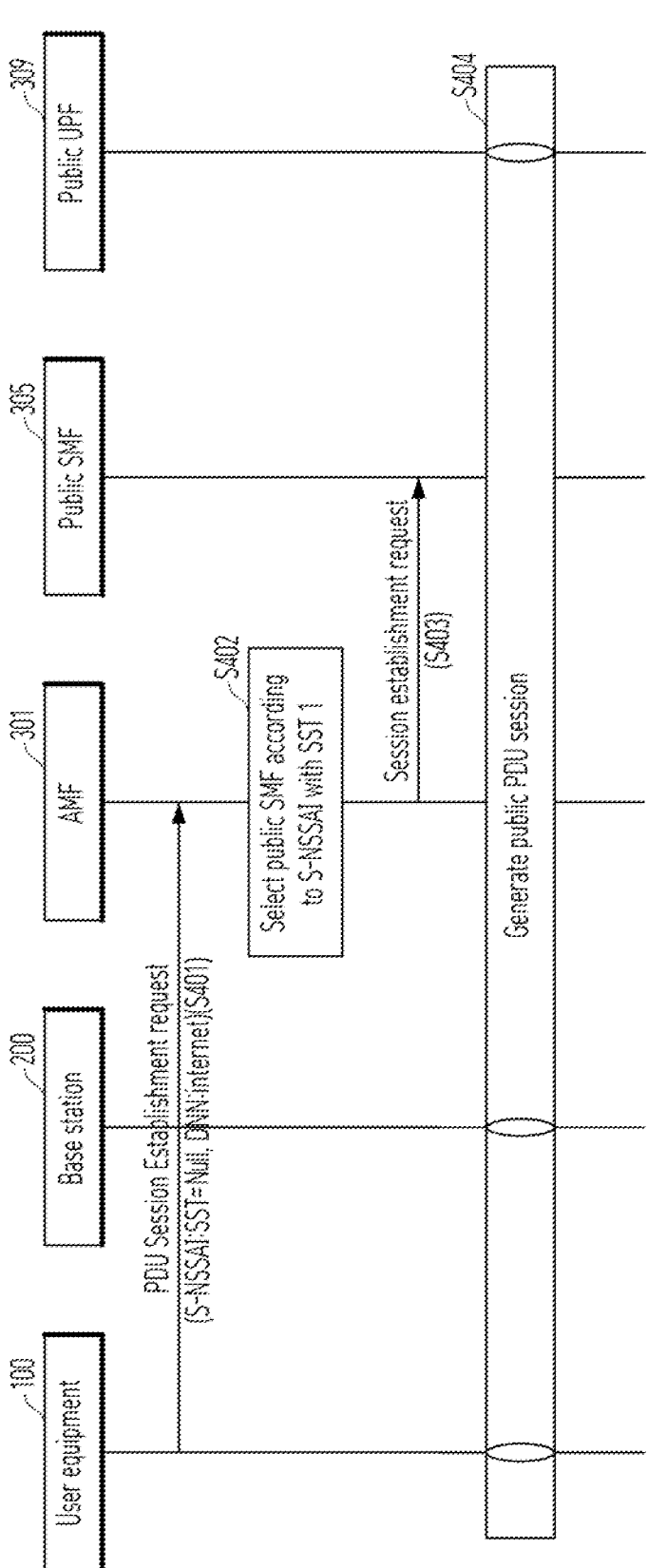
FIG. 4 is a flowchart illustrating a session establishment for accessing public network in accordance with an embodiment.

FIG. 4 is a flowchart illustrating a session establishment for accessing public network in accordance with an embodiment.

Referring to FIG. 4, user equipment 100 may transmit PDU session establishment request to AMF 301 through base station 200 at step S401. In accordance with the first embodiment, user equipment 100 may include, S-NSSAI with SST 1 and Internet as DNN in the PDU session establishment request because user equipment 100 stores Configured S-NSSAI with SST 1 and transmit it to AMF 301. In accordance with the second embodiment, user equipment 100 may include S-NSSAI with SST Null and Internet as DNN in the PDU session establishment request because Configured S-NSSAI of user equipment 100 is updated with Allowed S-NSSAI with SST 1 and 128 which is received at the previous initial registration procedure (e.g., at step S306).

At step S402, AMF 301 may select public SMF 305. In accordance with the first embodiment, AMF 301 may select public SMF 305 because SST of S-NSSAI included in the PDU session establishment request is 1. In accordance with the second embodiment, AMF 301 may select public SMF 305 because the default S-NSSAI with SST 1 which is received at the previous initial registration procedure (e.g., step S305). At step S403, AMF 301 may transmit a session create request to public SMF 305. For example, the session create request is PDU Session Create SM Context Request.

At step S404, public SMF 305 may create a public PDU session between user equipment 100 and public UPF 309 in cooperation with UDM 303, AMF 301, and public UPF 309. The public PDU session creation procedure be performed either follow established protocols in 5G SA based communication system or adhere to the telecommunication service provider's design. Accordingly, the detailed description thereof will be omitted herein.

As described, user equipment 100 may create the public PDU session with public UPF 309 and use a data service through public network 500. User equipment 100 may be able to switch to private network 600 while using the data service through public network 500.

Figure 5:
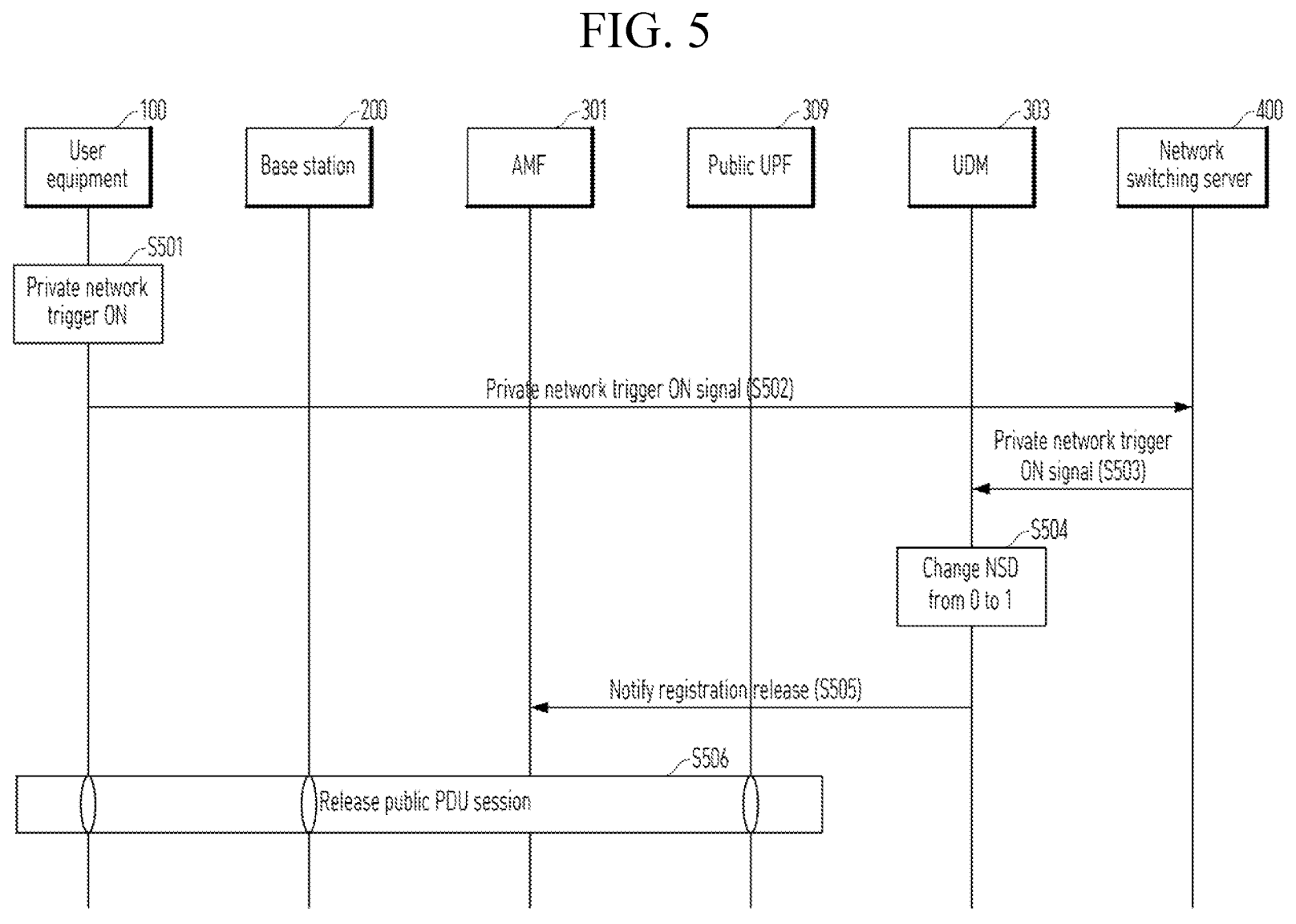

FIG. 5 is a flowchart illustrating an access release procedure for release access to public network according to a private network access trigger in accordance with an embodiment.

Referring to FIG. 5, a user of user equipment 100 may turn on a trigger for accessing private network 600 on a dedicated application of user equipment 100 at step S501. Accordingly, user equipment 100 may transmit a trigger ON signal for accessing private network to network switching server 400 through the public PDU session created between user equipment 100 and public UPF 309 at step S502.

At step S503, network switching server 400 may receive the trigger ON signal from user equipment 100 and transmit the trigger ON signal to UDM 303. At step S504, UDM 303 may change NSD setup at the subscriber profile of user equipment 100 according to the receipt of the trigger ON signal for accessing private network 600.

At step S505, UDM 303 may transmit a registration release notification for releasing the public PDU session to AMF 301 according to the change of NSD in the subscriber profile of user equipment 100. Here, the registration release notification may be EUCM Deregistration Notification.

At step S506, AMF 301 may perform the public PDU session release procedure between the user equipment 100 and the public UPF 309 upon the receipt of the registration release notification. The public PDU session release procedure may be performed either following established protocols in 5G SA based communication system or adhere to the telecommunication service provider's design. Accordingly, the detailed description thereof will be omitted herein.

As shown in FIG. 5, after release accessing to public network 500, user equipment 100 may perform initial registration procedure for accessing private network 600. Hereinafter, such an operation will be described with reference to FIG. 6.

Figure 6:
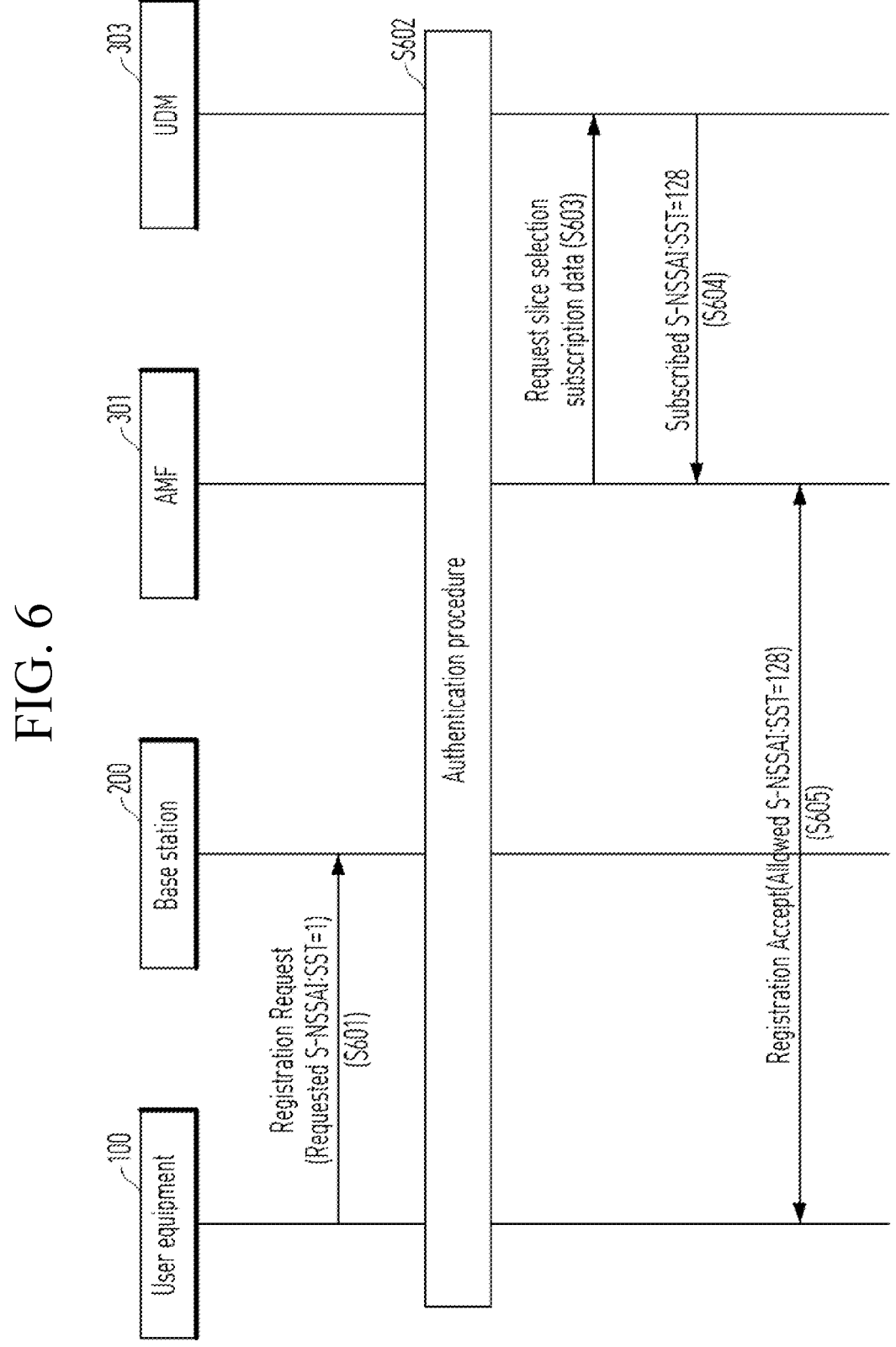
FIG. 6 is a flowchart illustrating an initial registration procedure for accessing a private network in accordance with an embodiment.

FIG. 6 is a flowchart illustrating an initial registration procedure for accessing a private network in accordance with an embodiment.

Referring to FIG. 6, user equipment 100 may transmit registration request for accessing private network 600 to AMF 301 through base station 200 at step S601. In accordance with the first embodiment, user equipment 100 may include Requested NSSAI with SST 128 in the registration request and transmit the registration request to AMF 301. In accordance with the second embodiment, user equipment 100 may include Requested NSSAI with SST 1 and 128 in the registration request by referring to Configured S-NSSAI with SST 1 and 128 stored in user equipment 100, which was updated by Allowed S-NSSAI received the initial registration procedure for the public network (e.g., S306). Then, user equipment 100 may transmit the registration request to AMF 301.

At step S602, AMF 301 may perform authentication procedure on user equipment 100. The authentication procedure may be performed either following established protocols in 5G SA based communication system or adhere to the telecommunication service provider's design. Accordingly, the detailed description thereof will be omitted herein.

After completing the authentication procedure, AMF 301 may transmit a slice selection subscription data request to UDM 303 at step S603. In accordance with an embodiment, the slice selection subscription data request may be Nudm_SDM_Get message.

At step S604, UDM 303 may transmit Subscribed S-NSSAI. In accordance with the first embodiment, UDM 303 may transmit Subscribed S-NSSAI with SST 128 to AMF 301 because Subscribed S-NSSAI with SST 1 and 128 as Subscriber S-NSSAI of user equipment 100 at the subscriber profile of user equipment 100, and NSD is set up as 1. In accordance with the second embodiment, UDM 303 may transmit Subscribed S-NSSAI with SST 1 and SST 128 and a default S-NSSAI 1 to AMF 301 because NSD is set up as 1 in the subscriber profile of user equipment 100.

At step S605, AMF 301 may transmit a registration accept to user equipment 100. In accordance with the first embodiment, AMF 301 may include Allowed S-NSSAI with SST 128 in registration accept based on Subscribed S-NSSAI with SST 128 which is received from UDM 303, and transmit the registration accept to user equipment 100. User equipment 100 may change Configured S-NSSAI with SST 1 to Configured S-NSSAI with SST 129 because user equipment 100 received Allowed S-NSSAI with SST 128. In accordance with the second embodiment, AMF 301 may include Allowed S-NSSAI with SST 1 and 128 in the registration accept and transmit the registration accept to user equipment 100.

Figure 7:
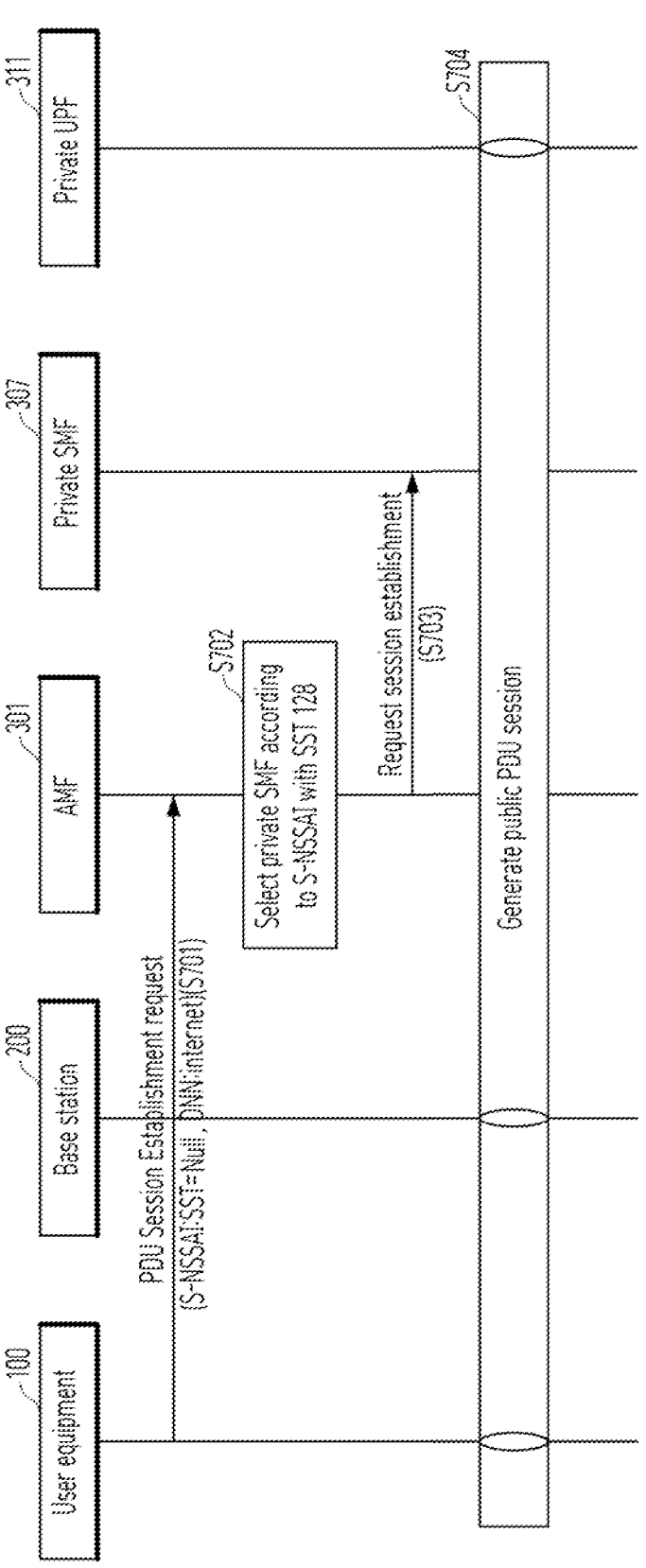
FIG. 7 is a flowchart illustrating a procedure of session establishment for accessing a private network in accordance with an embodiment.

FIG. 7 is a flowchart illustrating a procedure of session establishment for accessing a private network in accordance with an embodiment.

Referring to FIG. 7, user equipment 100 may transmit PDU session establishment request to AMF 301 through base station 200 at step S701. In accordance with the first embodiment, since user equipment 100 stores Configured S-NSSAI with SST 128, user equipment 100 may include S-NSSAI with SST 128 and Private network as DNN in the PDU session establishment request. In accordance with the second embodiment, user equipment 100 may include S-NSSAI with SST Null and internet as DNN in a PDU session establishment request because user equipment 100 received Allowed S-NSSAI with SST 1, 128 during the initial registration procedure and transmit the PDU session establishment request to AMF 301.

At step S702, AMF 301 may select private SMF 307. In accordance with the first embodiment, AMF 301 selects private SMF 307 because SST of S-NSSAI included in the PDU session establishment request is 128. In accordance with the second embodiment, AMF 301 selects private SMF 307 because AMF 301 receives the default S-NSSAI with SST 128.

At step S703, AMF 301 may transmit a session create request to SMF 307. The session create request may be PDU Session Create SM Context Request.

At step 704, dedicated SMF 307 may create a dedicated PDU session between user equipment 100 and private UPF 311 in cooperation with UDM 303, AMF 301, and private UPF 311. The dedicated PDU session create procedure may be performed either follow established protocols in 5G SA based communication system or adhere to the telecommunication service provider's design. Accordingly, the detailed description thereof will be omitted herein.

As shown in FIG. 7, user equipment 100 may create the dedicated PDU session with dedicated UPF 311 and access private network 600. User equipment 100 may switch to public network 500 again while accessing private network 600 and uses a service.

FIG. 8 is a flowchart illustrating a private network access release procedure according to a trigger OFF signal of a user equipment in accordance with an embodiment.

Referring to FIG. 8, user equipment 100 may off a trigger for accessing private network 600 at the dedicated application of user equipment 100 at step S801. At step S802, user equipment 100 may transmit a trigger OFF signal for releasing access of private network 600 to network switching server 400 through the dedicated PDU session created between user equipment 100 and dedicated UPF 311.

At step S803, network switching server 400 may transmit the trigger OFF signal for releasing access to private network 600, which is received from user equipment 100, to UDM 303. At step S804, UDM 303 may change NSD set at the subscriber profile of user equipment 100 from 1 to 0 for releasing access to private network 600.

At step S805, UDM 303 may transmit registration release notification for releasing of dedicated PDU session to AMF 301 according to the change of NSD in the subscriber profile of user equipment 100. Here, the registration release notification is EUCM Deregistration Notification.

At step S806, AMF 301 may perform a dedicated PDU session release procedure according to the receipt of the registration release notification. The dedicated PDU session release procedure may be performed either following established protocols in 5G SA based communication system or adhere to the telecommunication service provider's design. Accordingly, the detailed description thereof will be omitted herein.

After releasing private network 600 as shown in FIG. 8, user equipment 100 may perform the initial registration procedure for accessing public network 500. The initial registration procedure is already described with FIG. 3.

Figure 10:
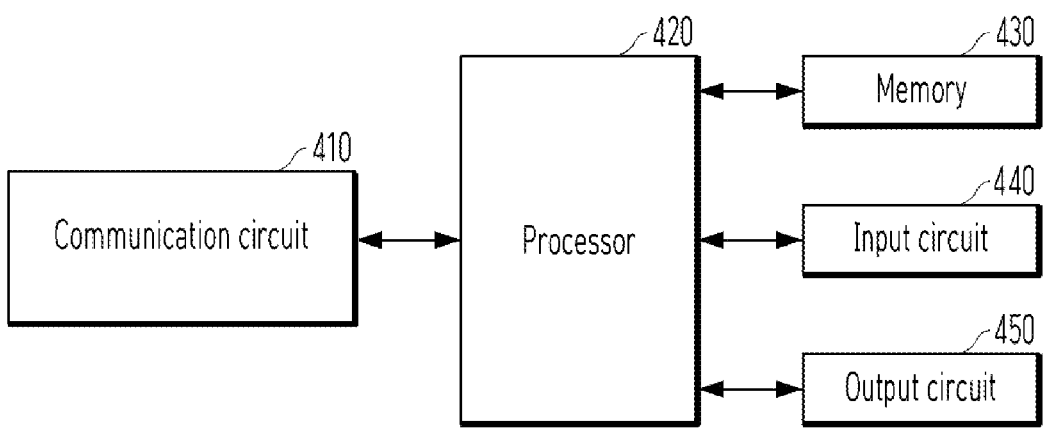
FIG. 10 is a block diagram illustrating an access mobility function (AMF) server for providing a network switching serviced in accordance with an embodiment.

Hereinafter, access and mobility function (AMF) 301 will be described in more detail with reference to FIG. 10. FIG. 10 is a block diagram illustrating a network apparatus (e.g., AMF) in accordance with an embodiment.

Referring to FIG. 10, access and mobility function (AMF) 301 may include communication circuit 410, processing circuit 420, memory 430, input circuit 440, and output circuit 450 in accordance with an embodiment. As described, access and mobility function 301 may be a computer system or a group of computers connected through a network, but the embodiments are not limited thereto.

Communication circuit 410 may include at least one circuitry module (or at least one circuit) for communicating with other entities through core network 200 and one of private network 600 and public network 500 or communication with internal nodes of 5G core system 300, such as UDM 303, public SMF 305, public UPF 309, private SMF 307, and private UPF 311. Herein, the communication network may be a 5G standalone (SA) communication network. However, the embodiments are not limited thereto. For example, the communication network may include a variety of communication networks such as a wireless communication network and a wired communication network, such as, a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network. Herein, the wireless communication circuit and wired communication may be separately or integrally configured.

The memory is connected to at least one processor and stores a program containing instructions that execute configurations and/or methods described below. The program is implemented in conjunction with hardware such as memory and at least one processor to realize the embodiments of the present disclosure. The storage device contains information necessary for the operation or action of the network device. The processor operates this invention in combination with hardware such as memory and storage devices.

Memory 430 may store a variety of information, such as software programs for operation, data received from other entities, and data generated as result of operations. That is, memory 430 may store operation system data, applications, and related data, received from other entities through a variety of communication media (e.g., communication networks). Memory 430 may include at least one of an internal memory and an external memory according to embodiments. For example, memory 130 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Input circuit 440 may be a user interface for receiving input from a user. For example, input circuit 140 may include any of a keypad, a dome switch, a touch pad, a jog wheel, and a jog switch, but is not limited thereto. Further, input circuit 140 may include several hardware key buttons. The hardware key buttons may include a hold key and a volume control button. Output circuit 450 may include a display panel and a circuit for controlling the display panel for visually outputting information processed by processing circuit 420. For example, display of output circuit 150 may be a liquid crystal display (LCD) panel, light emitting diode (LED) panel, organic light emitting diode (OLED) pane, or an active-matrix organic light-emitting diode (AMOLED) panel, but the present invention is not limited thereto.

Processing circuit 420 may be a set of processors for performing or controlling overall operation of access and mobility function server 301. For example, processing circuit 420 may be a central processing circuitry that controls constituent elements (e.g., memory, communication circuit, input/output circuit, etc.) of network switching server 400 and/or performs a variety of operations (or functions) of network switching server 400 for providing a network switching serviced to user equipment 100.

In accordance with an embodiment, processing circuit 420 may perform operations for providing a network switching service, described with reference to FIG. 2 to FIG. 8. For example, in accordance with the first embodiment, processing circuit 420 may perform operation of: receiving a registration request from the user equipment and transmitting a slice selection subscription data request to the subscriber apparatus; receiving subscribed S-NSSAI based on the network selection discriminator (NSD) from the subscriber apparatus; transmitting a registration response including allowed S-NSSAI based on the received subscribed S-NSSAI; and receiving a session establishment request including the allowed S-NSSAI from the user equipment and creating a session to one of a public network and a private network according to the allowed S-NSSAI included in the session establishment request.

In accordance with the second embodiment, processing circuit 420 may perform operations including: i) performing authentication on user equipment 100 during the initial registration procedure; ii) transmitting a slice selection subscription data request to UDM 303; iii) receiving Subscribed S-NSSAI with SST 1 and 128 and Default S-NSSAI with SST 1 or 128 which is decided by a network selection discriminator (NSD: 0 or 1) stored in a subscriber profile of user equipment 100, iv) including Allowed S-NSSAI with SST 1 and 128 in a registration accept, v) transmitting the registration accept to user equipment 100, vi) selecting one of public SMF and private SMF based on the received default S-NSSAI with SST value.

In accordance with an embodiment, UDM 303 may be an apparatus or a computer server having the structure similar to that of AMF 301 shown in FIG. 10. That is, UDM 303 may include a communication circuit, a processing circuit, a memory, an input circuit, and an output circuit in accordance with an embodiment. Furthermore, the processing circuit of UDM 303 may perform the following operations: i) receiving a slice selection subscription data from AMF 301, ii) transmitting Subscribed S-NSSAI with SST 1 and 128 and Default S-NSSAI with SST 1 or 128 which is decided by a network selection discriminator (NSD: 0 or 1) stored in a subscriber profile of user equipment 100 to AMF 301, iii) receiving information (e.g., changing information) on the trigger ON signal from network switching server 400, iv) changing a network selection discriminator (NSD), v) transmitting session release to AMF (e.g., Nudm_UECM_Dereg-istrationNotification).

According to the embodiments described above, it is possible to enable selective access to either public network 500 or private network 600 for user equipment 100 without requiring any changes in user equipment 100. This allows for the provision of specialized 5G services for enterprises with minim system development. This is particularly important for user equipment like iPhones that have many constraints: if modification to user equipment 100 are required, user equipment like iPhones would not be able to utilize services on a private network. However, the embodiments allow for selective access to either public network 500 or private network 600 without requiring any changes to user equipment 100.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present disclosure can be embodied in the form of methods and apparatuses for practicing those methods. The present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present disclosure can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present disclosure can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a network apparatus for providing a network switching service for enabling a user equipment to switch a communication network between a public network and a private network by communicating with a subscriber apparatus, where the subscriber apparatus stores subscribed Network Slice Selection Assistance Information (NSSAI) of the user equipment and a network selection discriminator (NSD) at a subscriber profile, the network selection discriminator (NSD) indicates a network selected by the user equipment, the method comprising:

receiving a registration request from the user equipment and transmitting a slice selection subscription data request to the subscriber apparatus;

receiving the subscribed NSSAI from the subscriber apparatus,;

transmitting a registration response including allowed S-NSSAI based on the received subscribed S-NSSAI; and receiving a session establishment request including the allowed S-NSSAI from the user equipment and creating a session to one of the public network and the private network according to the allowed S-NSSAI included in the session establishment request, wherein:

the subscriber apparatus stores S-NSSAI for a public network and S-NSSAI for a private network as the subscribed S-NSSAI of the user equipment;

the receiving subscribed S-NSSAI comprises receiving S-NSSAI for the public network from the subscriber apparatus in an event that the network selection discriminator (NSD) indicates the public network; and the creating a session comprises generating a session to the public network.

2. The method of claim 1, wherein:

the subscriber apparatus stores S-NSSAI for a public network and S-NSSAI for a private network as the subscribed S-NSSAI of the user equipment;

the receiving subscribed S-NSSAI comprises receiving S-NSSAI for the private network from the subscriber apparatus in an event that the network selection discriminator indicates the private network; and the creating a session comprises generating a session to the private network.

3. The method of claim 1, wherein the S-NSSAI for the public network and the S-NSSAI for the private network is identified by a slice service type (SST).

4. The method of claim 1, wherein the network selection discriminator (NSD) of the subscriber apparatus is changed to one of i) a discriminator for a public network and ii) a discriminator for a private network according to a trigger signal from the user equipment.

5. A method of a network apparatus for providing a network switching service to user equipment for switching a communication network between a private network and a public network, the method comprising;

transmitting a slice selection subscription data request to a subscription apparatus upon receiving of a registration request from the user equipment;

in response to the slice selection subscription data request, receiving subscribed Network Slice Selection Assistance Information (NSSAI) from the subscriber apparatus and default NSSAI; and including allowed NSSAI in a registration response and transmitting the registration response to the user equipment, wherein the default NSSAI is determined based on a network selection discriminator (NSD) stored in a subscriber profile of the user equipment, and the network selection discriminator (NSD) is set to have one of values 0 and 1, each indicates the public network and the private network, respectively.

6. The method of claim 5, wherein the network selection discriminator is changed from 0 to 1 or from 1 to 0 upon receiving a trigger signal for switching a communication network from the user equipment.

7. The method of claim 5, wherein the allowed NSSAI has at least one value indicating at least one allowed network to access which is determined based on values included in the received subscribed NSSAI.

8. The method of claim 5, wherein the allowed NSSAI included in the registration response has two values one indicating the public network and the other indicating the private network.

9. The method of claim 8, wherein the selecting comprises:

determining whether the subscribed NSSAI has a Null value;

identifying a value included in the default NSSAI which is received in response to the slice selection subscription data request; and selecting one of the public network and the private network based on the identified value of the default NSSAI.

10. The method of claim 5, further comprising:

receiving a session establishment request including subscribed NSSAI from the user equipment;

selecting one of the public network and the private network based on values included in the allowed S-NSSAI in the session establishment request; and creating a session to the selected one.

11. The method of claim 8, wherein the receiving subscribed NSSAI from the subscriber apparatus and default NSSAI comprises:

receiving Nudm_5DM_Get_Response from the subscription apparatus, including subscribed NSSAI that has values one indicating the public network and the other indicating the private network.

12. A network apparatus for providing a network switching service to user equipment for switching a communication network between a private network and a public network, the network apparatus comprising;

a memory configured to store data including subscribed network slice selection assistance information (NSSAI) and default NSSAI;

a communication circuit configured to communicate with other entities including a subscription apparatus, a service server, and the user equipment through a communication network;

a processing circuit configured to perform at least one of:

transmitting a slice selection subscription data request to a subscription apparatus upon receiving of a registration request from the user equipment; in response to the slice selection subscription data request, receiving subscribed Network Slice Selection Assistance Information (NSSAI) from the subscriber apparatus and default NSSAI; and including allowed NSSAI in a registration response and transmitting the registration response to the user equipment, wherein the default NSSAI is determined based on a network selection discriminator (NSD) stored in a subscriber profile of the user equipment, and the network selection discriminator (NSD) is set to have one of values 0 and 1, each indicates the public network and the private network, respectively.

13. The network apparatus of claim 12, wherein the network selection discriminator is changed from 0 to 1 or from 1 to 0 upon receiving a trigger signal for switching a communication network from the user equipment.

14. The network apparatus of claim 12, wherein the allowed NSSAI has at least one value indicating at least one allowed network to access which is determined based on values included in the received subscribed NSSAI.

15. The network apparatus of claim 12, wherein the allowed NSSAI included in the registration response has two values one indicating the public network and the other indicating the private network.

16. The network apparatus of claim 12, wherein the processing circuit is configured to further perform: receiving a session establishment request including subscribed NSSAI from the user equipment; selecting one of the public network and the private network based on values included in the allowed S-NSSAI in the session establishment request; and creating a session to the selected one.

17. The network apparatus of claim 16, wherein the processing circuit is configured to further perform: determining whether the subscribed NSSAI has a Null value;

identifying a value included in the default NSSAI which is received in response to the slice selection subscription data request; and selecting one of the public network and the private network based on the identified value of the default NSSAI.

* * * * *